(12) United States Patent
Chen et al.

(10) Patent No.: US 9,401,752 B2
(45) Date of Patent: Jul. 26, 2016

(54) METHOD AND DEVICE FOR PERFORMING CODEBOOK PROCESSING ON CHANNEL INFORMATION

(71) Applicant: ZTE Corporation, Shenzhen, Guangdong (CN)

(72) Inventors: Shijun Chen, Shenzhen (CN); Ye Liu, Shenzhen (CN); Ke Yao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/437,278

(22) PCT Filed: Jul. 3, 2013

(86) PCT No.: PCT/CN2013/078751
§ 371 (c)(1),
(2) Date: Apr. 21, 2015

(87) PCT Pub. No.: WO2013/167018
PCT Pub. Date: Nov. 14, 2013

(65) Prior Publication Data
US 2015/0280800 A1   Oct. 1, 2015

(30) Foreign Application Priority Data

Oct. 22, 2012 (CN) .......................... 2012 1 0404158

(51) Int. Cl.
*H04B 7/04* (2006.01)
*H04B 7/06* (2006.01)

(52) U.S. Cl.
CPC ............ *H04B 7/0478* (2013.01); *H04B 7/0619* (2013.01)

(58) Field of Classification Search
CPC ...... H04B 7/02; H04B 7/0413; H04B 7/0417; H04B 7/0452; H04B 7/0478; H04B 7/0482; H04B 7/0639; H04B 7/0619; H04L 25/0202; H04L 25/0204; H04L 25/0218; H04L 25/0222; H04L 25/024; H04L 25/0242

USPC ................. 375/253, 259, 260, 262, 265, 267; 370/310, 328, 329, 334, 335, 338, 342; 455/443, 456.5, 463, 24, 62, 69
See application file for complete search history.

(56) References Cited

U.S. PATENT DOCUMENTS

| | | | |
|---|---|---|---|
| 8,897,393 B1 * | 11/2014 | Zhang ...................... | H04L 1/00 375/316 |
| 2008/0219373 A1 * | 9/2008 | Zhang .................. | H04B 7/0417 375/262 |

(Continued)

FOREIGN PATENT DOCUMENTS

| CN | 101931513 A | 12/2010 |
|---|---|---|
| CN | 102457319 A | 5/2012 |

(Continued)

OTHER PUBLICATIONS

International Search Report in international application No. PCT/CN2013/078751, mailed on Oct. 3, 2013.

(Continued)

*Primary Examiner* — Young T Tse
(74) *Attorney, Agent, or Firm* — Oppedahl Patent Law Firm LLC

(57) ABSTRACT

A method and a device for performing codebook processing on channel information are described, wherein channel information obtained by channel estimation is analysed to obtain a value space and a null space; the value space or the null space of which a dimension is small is taken as a codebook space; a codebook space vector is selected; and multidimensional codebook processing is performed separately on each codebook space vector, and information obtained by performing codebook is fed back to a base station. Thus the channel information feedback quantity and the codebook precision can be balanced flexibly without expanding codebook capacity, and the codebook precision is improved and channel information distortion is deduced under a premise that channel information data quantity is reduced.

14 Claims, 7 Drawing Sheets

(56) References Cited

U.S. PATENT DOCUMENTS

| | | | |
|---|---|---|---|
| 2010/0142633 A1* | 6/2010 | Yu | H04B 7/0417 375/260 |
| 2011/0009125 A1* | 1/2011 | Shin | H04B 7/024 455/452.1 |
| 2011/0122971 A1* | 5/2011 | Kim | H04B 7/0417 375/316 |
| 2011/0170623 A1* | 7/2011 | Park | H04L 25/0204 375/260 |
| 2012/0040702 A1* | 2/2012 | Wu | H04B 7/024 455/501 |
| 2012/0106384 A1 | 5/2012 | Zhang | |
| 2012/0106470 A1* | 5/2012 | Clerckx | H04B 7/0632 370/329 |
| 2012/0218948 A1 | 8/2012 | Onggosanusi | |
| 2012/0257579 A1* | 10/2012 | Li | H04B 7/0626 370/328 |

FOREIGN PATENT DOCUMENTS

| | | |
|---|---|---|
| EP | 2456087 A1 | 5/2012 |
| EP | 2573954 A1 | 3/2013 |
| WO | 2011098670 A1 | 8/2011 |

OTHER PUBLICATIONS

English Translation of the Written Opinion of the International Search Authority in international application No. PCT/CN2013/078751, mailed on Oct. 3, 2013.

Supplementary European Search Report in European application No. 13787275.0, mailed on Oct. 15, 2015.

Heilpern T et al: "Beam-based back-propagation and Music imaging" Electrical and Electronics Engineers in Israel (IEEEI), 2010 IEEE 26th Convention of, IEEE, Piscataway, NJ, USA, Nov. 17, 2010, pp. 1002-1006, XP031830489, ISBN: 978-1-4244-8681-6 * Chapter IV p. 1003 *.

Jean-Baptiste Yamindi et al: "The optimization capacity of the MU-MIMO with channel quality information", Consumer Electronics (ISCE), 2012 IEEE16th International Symposium on, IEEE, Jun. 4, 2012, pp. 1-5, XP032203079, DOI : 10.1109/ISCE.2012.6241685 ISBN: 978-1-4673-1354-4 * Chapter IV, 3; p. 2, right-hand column *.

* cited by examiner

Fig. 1

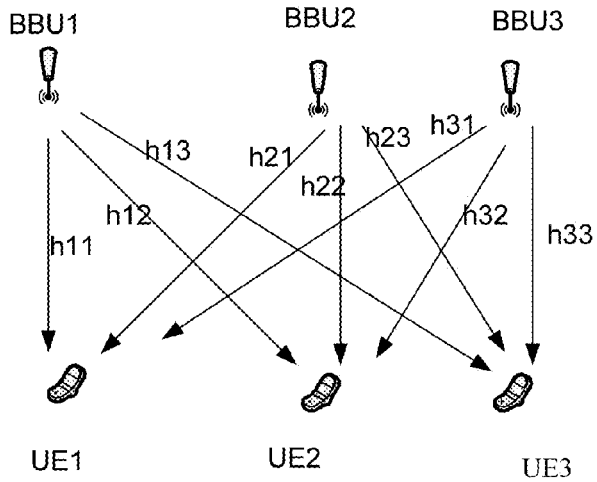

Fig. 2

| Codebook index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Codeword vector | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| | 0.5 | 0 + 0.5i | -0.5 | 0 - 0.5i | 0.3536 + 0.3536i | -0.3536 + 0.3536i | -0.3536 - 0.3536i | 0.3536 - 0.3536i | 0.5 | 0 + 0.5i | -0.5 | 0 - 0.5i | 0.5 | 0.5 | -0.5 | -0.5 |
| | 0.5 | -0.5 | 0.5 | -0.5 | 0 + 0.5i | 0 - 0.5i | 0 + 0.5i | 0 - 0.5i | -0.5 | 0.5 | -0.5 | 0.5 | 0.5 | -0.5 | 0.5 | -0.5 |
| | 0.5 | 0 - 0.5i | -0.5 | 0 + 0.5i | -0.3536 - 0.3536i | 0.3536 + 0.3536i | 0.3536 - 0.3536i | -0.3536 - 0.3536i | -0.5 | 0 + 0.5i | 0.5 | 0 - 0.5i | -0.5 | 0.5 | 0.5 | -0.5 |

Fig. 3

| Full interference scene a: all UEs unconditionally request for coordination, and all base stations unconditionally provide coordination | | | | | | | | | | | | | |
|---|---|---|---|---|---|---|---|---|---|---|---|---|---|
| Average spectrum efficiency | SU | | | One WCI | | | Two WCIs | | | Three WCIs | | | |
| 3 UEs averagely | 1.68 | | | 1.88 | | | 2.05 | | | 2.13 | | | |
| 3 UEs separately | 1.66 | 1.75 | 1.64 | 1.85 | 1.90 | 1.90 | 2.07 | 2.02 | 2.07 | 2.17 | 2.12 | 2.11 | |
| CB/SU | | | | | | | | | | | | | |
| 3 UEs averagely | | | | 111.7% | | | 122.0% | | | 126.7% | | | |
| 3 UEs separately | | | | 110.9% | 108.5% | 116.0% | 124.6% | 115.3% | 126.4% | 130.3% | 121.2% | 129.0% | |

| Full interference scene b: base station 2 performs CB for only UE1, and base station 3 performs coordination for UE1 and UE2 | | | | | | | | | | | | | |
|---|---|---|---|---|---|---|---|---|---|---|---|---|---|
| Average spectrum efficiency | SU | | | One WCI | | | Two WCIs | | | Three WCIs | | | |
| 3 UEs averagely | 1.68 | | | 1.90 | | | 2.00 | | | 2.04 | | | |
| 3 UEs separately | 1.66 | 1.75 | 1.64 | 2.60 | 1.81 | 1.30 | 2.86 | 1.90 | 1.24 | 2.97 | 1.93 | 1.23 | |
| CB/SU | | | | | | | | | | | | | |
| 3 UEs averagely | | | | 113.1% | | | 118.6% | | | 121.3% | | | |
| 3 UEs separately | | | | 156.4% | 103.3% | 79.4% | 172.1% | 108.3% | 75.7% | 178.6% | 109.9% | 75.1% | |

| Full interference scene c: both base stations 2 and 3 serve only UE1 | | | | | | | | | | | | | |
|---|---|---|---|---|---|---|---|---|---|---|---|---|---|
| Average spectrum efficiency | SU | | | One WCI | | | Two WCIs | | | Three WCIs | | | |
| 3 UEs averagely | 1.68 | | | 1.89 | | | 1.94 | | | 1.97 | | | |
| 3 UEs separately | 1.66 | 1.75 | 1.64 | 2.67 | 1.55 | 1.44 | 2.91 | 1.49 | 1.41 | 3.00 | 1.49 | 1.43 | |
| CB/SU | | | | | | | | | | | | | |
| 3 UEs averagely | | | | 112.1% | | | 114.9% | | | 117.1% | | | |
| 3 UEs separately | | | | 160.3% | 88.5% | 88.2% | 174.6% | 84.9% | 86.3% | 180.1% | 85.0% | 87.3% | |

Fig. 8

| Codebook Serial number | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1.00 | 0.00 | 0.00 | 0.00 | 0.65 | 0.27 | 0.27 | 0.65 | 0.00 | 0.71 | 0.00 | 0.71 | 0.50 | 0.50 | 0.50 | 0.50 |
| 1 | 0.00 | 1.00 | 0.00 | 0.00 | 0.65 | 0.65 | 0.27 | 0.27 | 0.71 | 0.00 | 0.71 | 0.00 | 0.50 | 0.50 | 0.50 | 0.50 |
| 2 | 0.00 | 0.00 | 1.00 | 0.00 | 0.27 | 0.65 | 0.65 | 0.27 | 0.00 | 0.71 | 0.00 | 0.71 | 0.50 | 0.50 | 0.50 | 0.50 |
| 3 | 0.00 | 0.00 | 0.00 | 1.00 | 0.27 | 0.27 | 0.65 | 0.65 | 0.71 | 0.00 | 0.71 | 0.00 | 0.50 | 0.50 | 0.50 | 0.50 |
| 4 | 0.65 | 0.65 | 0.27 | 0.27 | 1.00 | 0.00 | 0.00 | 0.00 | 0.65 | 0.65 | 0.27 | 0.27 | 0.65 | 0.27 | 0.27 | 0.65 |
| 5 | 0.27 | 0.65 | 0.65 | 0.27 | 0.00 | 1.00 | 0.00 | 0.00 | 0.27 | 0.65 | 0.65 | 0.27 | 0.27 | 0.65 | 0.65 | 0.27 |
| 6 | 0.27 | 0.27 | 0.65 | 0.65 | 0.00 | 0.00 | 1.00 | 0.00 | 0.27 | 0.27 | 0.65 | 0.65 | 0.27 | 0.65 | 0.65 | 0.27 |
| 7 | 0.65 | 0.27 | 0.27 | 0.65 | 0.00 | 0.00 | 0.00 | 1.00 | 0.65 | 0.27 | 0.27 | 0.65 | 0.65 | 0.27 | 0.27 | 0.65 |
| 8 | 0.00 | 0.71 | 0.00 | 0.71 | 0.65 | 0.27 | 0.27 | 0.65 | 1.00 | 0.00 | 0.00 | 0.00 | 0.50 | 0.50 | 0.50 | 0.50 |
| 9 | 0.71 | 0.00 | 0.71 | 0.00 | 0.65 | 0.65 | 0.27 | 0.27 | 0.00 | 1.00 | 0.00 | 0.00 | 0.50 | 0.50 | 0.50 | 0.50 |
| 10 | 0.00 | 0.71 | 0.00 | 0.71 | 0.27 | 0.65 | 0.65 | 0.27 | 0.00 | 0.00 | 1.00 | 0.00 | 0.50 | 0.50 | 0.50 | 0.50 |
| 11 | 0.71 | 0.00 | 0.71 | 0.00 | 0.27 | 0.27 | 0.65 | 0.65 | 0.00 | 0.00 | 0.00 | 1.00 | 0.50 | 0.50 | 0.50 | 0.50 |
| 12 | 0.50 | 0.50 | 0.50 | 0.50 | 0.65 | 0.27 | 0.27 | 0.65 | 0.50 | 0.50 | 0.50 | 0.50 | 1.00 | 0.00 | 0.00 | 0.00 |
| 13 | 0.50 | 0.50 | 0.50 | 0.50 | 0.27 | 0.65 | 0.65 | 0.27 | 0.50 | 0.50 | 0.50 | 0.50 | 0.00 | 1.00 | 0.00 | 0.00 |
| 14 | 0.50 | 0.50 | 0.50 | 0.50 | 0.27 | 0.65 | 0.65 | 0.27 | 0.50 | 0.50 | 0.50 | 0.50 | 0.00 | 0.00 | 1.00 | 0.00 |
| 15 | 0.50 | 0.50 | 0.50 | 0.50 | 0.65 | 0.27 | 0.27 | 0.65 | 0.50 | 0.50 | 0.50 | 0.50 | 0.00 | 0.00 | 0.00 | 1.00 |

Fig. 9

METHOD AND DEVICE FOR PERFORMING CODEBOOK PROCESSING ON CHANNEL INFORMATION

TECHNICAL FIELD

The disclosure relates to an inter-cell multi-antenna coordination technique in a wireless communications field, and particularly relates to a method and a device for performing codebook processing on channel information.

BACKGROUND

As a standard of a 4th Generation (4G) telecommunications system, International Mobile Telecommunications-Advanced (IMT-Advanced) proposes a higher requirement for performance of the system, and particularly has a higher requirement for uplink and downlink frequency efficiency. Recently, Coordinated Multi-Point transmission/reception (COMP) is constantly concerned and studied as a hotspot technique of the IMT-Advanced.

The COMP technique is a technique which improves coverage of high rate transmission, cell edge service quality and throughput, and system throughput, and is an important technique of improving system spectrum utilization ratio. The so called COMP, namely coordinate transmission by multiple base stations, servers one or more User Equipments (UEs). The COMP defined by a 3rd Generation Partnership Project (3GPP) includes two scenes: one scene is multi-point coordination scheduling, namely coordinating interference among transmitted signals of cells by interactively scheduling information between adjacent nodes; another scene is multi-point joint processing, namely providing jointly a service to a target UE by sharing data, Channel Situation Information (CSI), scheduled information, and etc. among multiple coordinate points.

An advantage of the multi-point coordinated scheduling is that it is unnecessary to interact too much information between nodes, and there is no influence on a wireless interface; a disadvantage is that coordinated transmission gain cannot be obtained, and there is no contribution to improvement of spectrum utilization ratio. An advantage of the multi-point joint processing is that macro diversity and coordinated transmission gain and advanced antenna processing gain can be obtained; the disadvantage is that a lot of interaction between data information and CSI information is required to be performed, and complexity is high.

Signal interference may be generated among multiple cells, as shown in FIG. 1, three adjacent cells are separately a cell 1, a cell 2, and a cell 3, and a first UE 1, a second UE 2, and a third UE 3 separately belong to the cell 1, the cell 2 and the cell 3. Signals sent by a base station of the cell 2 and a base station of the cell 3 may interfere the UE in the cell 1, the signals sent by base stations of the cell 1 and the cell 3 may interfere the UE in the cell 2, and the signals sent by base stations of the cell 1 and the cell 2 may interfere the UE in the cell 3.

Currently, an inter-cell multi-antenna coordination technique, namely the COMP technique, is generally adopted to reduce inter-cell signal interference; the inter-cell multi-antenna coordination technique usually includes that: UE measures channel information of a main signal and channel information of an interference signal, and sends the channel information to a base station to which the UE belongs; the base station to which the UE belongs sends the channel information of the interference signal to an adjacent base station; the adjacent base station determines a space in which the interference is small according to interference channel information, and the base station to which the UE belongs sends a signal in the determined space in which the interference is small.

The inter-cell multi-antenna coordination technique includes a step of UE feeding back channel information to A base station to which the UE belongs. However, since data quantity of the channel information is large, in order to reduce transmitted data quantity, the UE generally needs to perform codebook processing on the channel information, and does not directly feed back all of the channel information. The codebook processing is referred to matching the channel information obtained by channel estimation with a codeword vector in a codebook table, and taking an index corresponding to a best matched (most relevant) codeword vector as feedback information, wherein a R8 codebook table shown in FIG. 2 may be adopted as the codebook table. There are two types of feedback information, namely a Worst Codeword Index (WCI) and a Best Codeword Index (BCI), which separately correspond to a maximum interference codeword and a minimum interference codeword.

Although the codebook processing reduces feedback information quantity, accuracy of channel information is also reduced, resulting in channel information distortion. A lot of research shows that: codebook precision, particularly the codebook precision of an interference channel, has a great influence on COMP performance, for example when channel information is integrated, many COMP algorithms may make the COMP performance to obtain a higher gain, and have a very good effect of eliminating interference; but in the circumstance that codebook processing is performed on channel information, COMP algorithms may make the COMP performance to obtain only a smaller gain, even no gain, and the effect of eliminating interference is bad.

Currently, the following two methods are mainly adopted to improve codebook precision of channel information: one method is to expand codebook capacity, another method is to feed back multiple codewords (such as two codewords which are separately a most relevant codeword and a second most relevant codeword), and a base station side combines the received multiple codewords into one vector.

With regard to the method of expanding codebook capacity, since the characteristic of a channel space is not known and only mean quantization can be performed in a multi-dimensional space, therefore the method of expanding codebook capacity can improve codebook precision of the channel information in some scenes, but cannot improve codebook precision of the channel information in some other scenes. Whether the codebook precision of channel information can be improved or not has a strong relevance with the scene, so the codebook precision of the channel information cannot be improved stably.

With regard to the method of feeding back multiple codewords, since each codeword has a relatively big quantization error, multiple codewords may generate a bigger accumulated error, and the codebook precision of channel information cannot be effectively improved, as shown in FIG. 3.

Both the above two methods cannot effectively improve the codebook precision of channel information, therefore COMP gain cannot be effectively improved, a good effect of eliminating interference cannot be reached.

SUMMARY

In view of this, a main purpose of the disclosure is to provide a method and a device for performing codebook processing on channel information, so as to improve codebook precision and deduce channel information distortion under a premise that channel information data quantity is reduced.

In order to achieve the above purpose, a technical scheme of embodiments of the disclosure is implemented in the following way.

An embodiment of the disclosure provides a method for performing codebook processing on channel information, which includes:

taking a value space or a null space which has a small dimension as a codebook space;

selecting a codebook space vector; and performing multidimensional codebook processing separately on each codebook space vector, and feeding back information obtained by the codebook processing to a base station.

Preferably, the step of analysing the channel information obtained by the channel estimation, to obtain the value space and the null space may include:

performing singular value decomposition (svd) on the channel information obtained by the channel estimation, to obtain three matrixes which respectively are a left singular value matrix, a right singular value matrix, and a singular value matrix; and taking a vector of the right singular value matrix corresponding to a singular value in the three matrixes of which an absolute value is less than or equal to a preset first threshold as the null space, and taking a vector of the right singular value matrix corresponding to a singular value in the three matrixes of which an absolute value is larger than the preset first threshold as the value space.

Preferably, the step of taking the value space or the null space which has a small dimension as the codebook space may include:

judging whether vector quantity in the value space is less than or equal to vector quantity in the null space or not; if the vector quantity in the value space is less than or equal to the vector quantity in the null space, then taking the value space as the codebook space; if the vector quantity in the value space is larger than the vector quantity in the null space, then taking the null space as the codebook space.

Preferably, the step of selecting the codebook space vector may include:

projecting each codeword vector in a codebook table to the codebook space, to obtain a projection vector of each codeword vector; selecting successively projection vectors having a same dimension as the codebook space according to a sequence of modulus of the projection vectors from large to small, to obtain the codebook space vector; or taking directly a vector of the codebook space as the codebook space vector.

Preferably, the step of selecting successively the projection vector having a same dimension as the codebook space to obtain the codebook space vector may include:

selecting successively the projection vectors having a same dimension as the codebook space, and normalizing and orthogonalizing each selected projection vector separately, to obtain the codebook space vector.

Preferably, the step of performing separately multidimensional codebook processing on each codebook space vector, and feeding back the information obtained by the codebook processing to the base station may include:

calculating separately modulus of a product between any codebook space vector and each codeword vector in a codebook table to obtain values, and obtaining a queue by sorting the obtained values in accordance with a sequence from large to small;

selecting a codeword corresponding to a value at a first place of the queue as a maximum codeword;

judging whether |the codebook space vector*a maximum codeword vector|$^2$ is larger than or equal to a preset second threshold or not; when |the codebook space vector*the maximum codeword vector|$^2$ is less than the preset second threshold, selecting, from an orthogonal basis vector set in which the maximum codeword is located, a codeword corresponding to a value at a second place of the queue as a second maximum codeword; obtaining a relative projection component by dividing a component of the codebook space vector on the second maximum codeword by a component of the codebook space vector on the maximum codeword; and performing codebook processing separately on an angle and modulus of the relative projection component to obtain a quantified result;

judging whether |the codebook space vector*the maximum codeword vector|$^2$+|the codebook space vector*a second maximum codeword vector|$^2$ is larger than or equal to the preset second threshold or not; when |the codebook space vector*the maximum codeword vector|$^2$+|the codebook space vector*the second maximum codeword vector|$^2$ is less than the preset second threshold, selecting, from the orthogonal basis vector set in which the maximum codeword is located, a codeword corresponding to a value at a third place of the queue as a third maximum codeword;

calculating a relative projection component of the codebook space vector on the third maximum codeword relative to the codebook space vector on the maximum codeword, and performing codebook processing separately on an angle and modulus of the relative projection component to obtain a quantified result, until a quadratic sum of modulus of a product between the codebook space vector and each selected codeword vector is larger than or equal to the preset second threshold;

performing codebook processing separately on other codebook space vectors in accordance with the above steps; and feeding back a codebook index corresponding to each selected codeword vector, and the quantified result of each relative projection component to the base station.

Preferably, the step of performing multidimensional codebook processing separately on each codebook space vector, and feeding back the information obtained by the codebook processing to the base station may include:

calculating separately modulus of a product between any codebook space vector and each codeword vector in a codebook table to obtain values, and obtaining a queue by sorting the obtained values in accordance with a sequence from large to small;

selecting a codeword corresponding to a value at a first place of the queue as a maximum codeword, and setting codeword quantity as an initial value;

judging whether quantity of the selected maximum codeword reaches a preset third threshold or not, and when the preset third threshold is reached, feeding back a codebook index corresponding to a maximum codeword vector to the base station;

when the preset third threshold is not reached, selecting, from an orthogonal basis vector set in which the maximum codeword is located, a codeword corresponding to a value at a second place of the queue as a second maximum codeword, and adding the codeword quantity by 1; dividing a component of the codebook space vector on the second maximum codeword by a component of the codebook space vector on the maximum codeword to obtain a relative projection component; performing codebook processing separately on an angle and modulus of the relative projection vector to obtain a quantified result;

judging whether quantity of the selected second maximum codeword reaches the preset third threshold or not, and when the preset third threshold is not reached, selecting, from the orthogonal basis vector set in which the maximum codeword is located, a codeword corresponding to a value at a third place of the queue as a third maximum codeword, and adding the codeword quantity by 1 again;

calculating a relative projection component of the codebook space vector on the third maximum codeword relative to the codebook space vector on the maximum codeword, and performing codebook processing separately on an angle and modulus of the relative projection component to obtain a quantified result, until quantity of a selected codeword reaches the preset third threshold;

performing codebook processing separately on other codebook space vectors in accordance with the above steps; and feeding back a codebook index corresponding to each selected codeword vector, and the quantified result of each relative projection component to the base station.

Another embodiment provides a device which includes:

a value space and null space obtaining unit, configured to analyse channel information obtained by channel estimation, to obtain a value space and a null space;

a codebook space determining unit, configured to take a value space or a null space which has a small dimension as a codebook space;

a codebook space vector selecting unit, configured to select a codebook space vector; and an information feedback unit, configured to perform separately multidimensional codebook processing on each codebook space vector, and feed back information obtained by the codebook processing to a base station.

Preferably, the value space and null space obtaining unit may be configured to:

perform svd on the channel information obtained by the channel estimation, to obtain three matrixes which respectively are a left singular value matrix, a right singular value matrix, and a singular value matrix; and take a vector of the right singular value matrix corresponding to a singular value in the three matrixes of which an absolute value is less than or equal to a preset first threshold as the null space, and take a vector of the right singular value matrix corresponding to a singular value in the three matrixes of which an absolute value is larger than the preset first threshold as the value space.

Preferably, the codebook space determining unit may be configured to judge whether vector quantity in the value space is less than or equal to vector quantity in the null space or not; to, if the vector quantity in the value space is less than or equal to the vector quantity in the null space, take the value space as the codebook space; and to, if the vector quantity in the value space is larger than the vector quantity in the null space, take the null space as the codebook space.

Preferably, the codebook space vector selecting unit may be configured to:

project each codeword vector in a codebook table to the codebook space, to obtain a projection vector of each codeword vector; select successively projection vectors having a same dimension as the codebook space according to a sequence of modulus of the projection vectors from large to small, to obtain the codebook space vector; or take directly a vector of the codebook space as the codebook space vector.

Preferably, the codebook space vector selecting unit may be configured to select successively the projection vectors having a same dimension as the codebook space, and normalize and orthogonalize each selected projection vector separately to obtain the codebook space vector.

Preferably, the information feedback unit may be configured to:

calculate separately modulus of a product between any codebook space vector and each codeword vector in a codebook table to obtain values, and obtain a queue by sorting the obtained values in accordance with a sequence from large to small;

select a codeword corresponding to a value at a first place of the queue, as a maximum codeword;

judge whether $|\text{the codebook space vector}*\text{a maximum codeword vector}|^2$ is larger than or equal to a preset second threshold or not, and when $|\text{the codebook space vector}*\text{the maximum codeword vector}|^2$ is less than the preset second threshold, select, from an orthogonal basis vector set in which the maximum codeword is located, a codeword corresponding to a value at a second place of the queue as a second maximum codeword; obtain a relative projection component by dividing a component of the codebook space vector on the second maximum codeword by a component of the codebook space vector on the maximum codeword; and perform codebook processing separately on an angle and modulus of the relative projection component to obtain a quantified result;

judge whether $|\text{the codebook space vector}*\text{the maximum codeword vector}|^2+|\text{the codebook space vector}*\text{the second maximum codeword vector}|^2$ is larger than or equal to the preset second threshold or not, and when $|\text{the codebook space vector}*\text{the maximum codeword vector}|^2+|\text{the codebook space vector}*\text{the second maximum codeword vector}|^2$ is less than the preset second threshold, select, from the orthogonal basis vector set in which the maximum codeword is located, a codeword corresponding to a value at a third place of the queue as a third maximum codeword;

calculate a relative projection component of the codebook space vector on the third maximum codeword relative to the codebook space vector on the maximum codeword, and perform codebook processing separately on an angle and modulus of the relative projection component to obtain a quantified result, until a quadratic sum of modulus of a product between the codebook space vector and each selected codeword vector is larger than or equal to the preset second threshold;

perform codebook processing separately on other codebook space vectors in accordance with the above steps; and feed back a codebook index corresponding to each selected codeword vector, and the quantified result of each relative projection component to the base station.

Preferably, the information feedback unit may be configured to:

calculate separately modulus of a product between any codebook space vector and each codeword vector in a codebook table to obtain values, and obtain a queue by sorting the obtained values in accordance with a sequence from large to small;

select a codeword corresponding to a value at a first place of the queue, as a maximum codeword, and set codeword quantity as an initial value;

judge whether the quantity of the selected maximum codeword reaches a preset third threshold or not, and when the preset third threshold is reached, feed back a codebook index corresponding to a maximum codeword vector to the base station;

when the preset third threshold is not reached, select, from an orthogonal basis vector set in which the maximum codeword is located, a codeword corresponding to a value at a second place of the queue as a second maximum codeword, and add the codeword quantity by 1; divide a component of the codebook space vector on the second maximum codeword by a component of the codebook space vector on the maximum codeword, to obtain a relative projection component; and perform codebook processing separately on an angle and modulus of the relative projection vector to obtain a quantified result;

judge whether the quantity of the selected second maximum codeword reaches a preset third threshold or not, and when the third threshold is not reached, select, from the orthogonal basis vector set in which the maximum codeword is located, a codeword corresponding to a value at a third place of the queue as a third maximum codeword, and add the codeword quantity by 1 again;

calculate a relative projection component of the codebook space vector on the third maximum codeword relative to the codebook space vector on the maximum codeword, and perform codebook processing separately on an angle and modulus of the relative projection component to obtain a quantified result, until quantity of a selected codeword reaches the preset third threshold;

perform codebook processing separately on other codebook space vectors in accordance with the above steps; and feed back a codebook index corresponding to each selected codeword vector, and the quantified result of each relative projection component to the base station.

It is known from above description that the embodiments of the disclosure can accurately measure a gap between codebook processing and a vector, and select different dimensions according to a precision requirement to perform codebook processing, and can also flexibly balance precision and feedback quantity. Under the premise of reducing data quantity of channel information, the codebook precision is improved and the channel information distortion is reduced to a maximum limit, because a component parameter is fed back. This disclosure shows strong adaptability to a codebook, a good effect can also be achieved even though codebook capacity is small.

BRIEF DESCRIPTION OF THE DRAWINGS

FIG. 1 is a schematic diagram of signal interference among multiple cells;

FIG. 2 is a R8 codebook table;

FIG. 3 is a schematic diagram of COMP gain obtained by adopting an existing method for feeding back multiple codewords;

FIG. 8 is a codebook relevance table;

FIG. 9 is a schematic diagram of COMP gain obtained by adopting a third embodiment of the disclosure;

DETAILED DESCRIPTION

Figure 4:
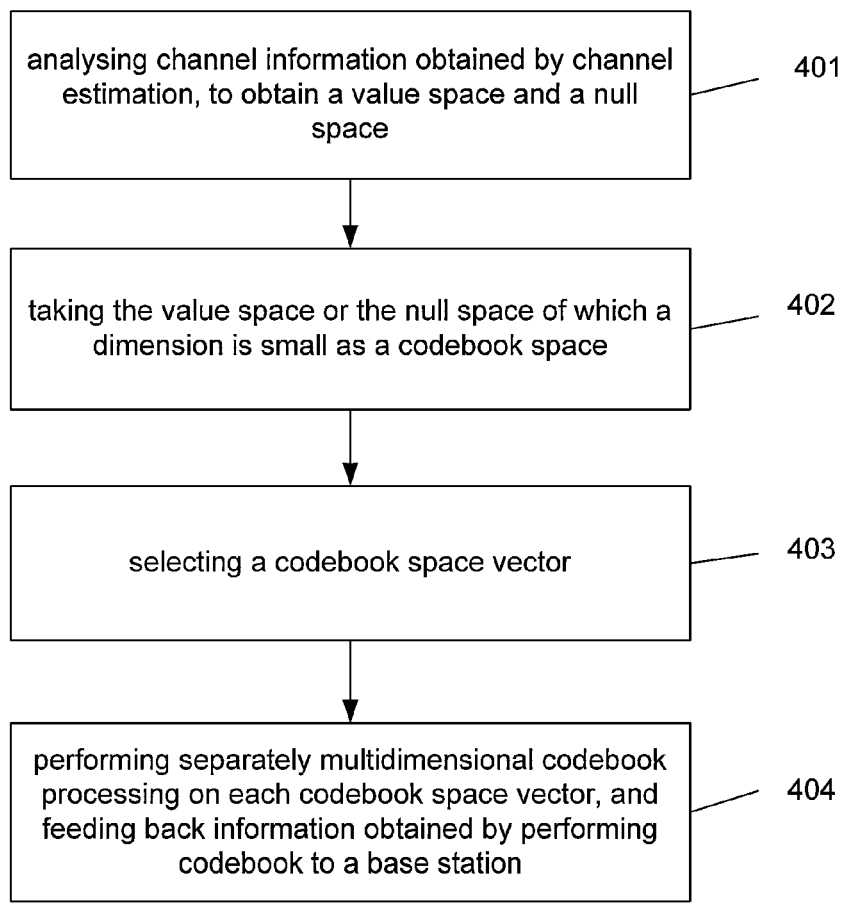
FIG. 4 is a flowchart of implementing a first embodiment of a method for performing codebook processing on channel information of the disclosure.

A first embodiment of a method for performing codebook processing on channel information provided by the disclosure is shown in FIG. 4, and the method includes that:

Step 401, channel information obtained by channel estimation is analyzed to obtain a value space and a null space;

Step 402, a value space or a null space of which a dimension is small is taken as a codebook space;

Step 403, a codebook space vector is selected; and

Step 404, multidimensional codebook processing is performed separately on each codebook space vector, and information obtained by the codebook processing is fed back to a base station.

Preferably, the Step 401 may be that svd is performed on the channel information obtained by the channel estimation to obtain three matrixes, namely a left singular value matrix, a right singular value matrix, and a singular value matrix; and a vector of the right singular value matrix corresponding to a singular value in the three matrixes of which an absolute value is less than or equal to a preset first threshold is taken as the null space, and the vector of the right singular value matrix corresponding to the singular value in the three matrixes of which the absolute value is larger than the preset first threshold is taken as the value space.

Preferably, the Step 402 may be that it is judged whether vector quantity in the value space is less than or equal to vector quantity in the null space or not, and if the vector quantity in the value space is less than or equal to the vector quantity in the null space, then the value space is taken as the codebook space; if the vector quantity in the value space is larger than the vector quantity in the null space, then the null space is taken as the codebook space.

Preferably, the Step 403 may be that each codeword vector in a codebook table is projected separately to the codebook space to obtain a projection vector corresponding to each codeword vector; projection vectors having a same dimension are selected successively as the codebook space according to a sequence of modulus of the projection vector from large to small, to obtain the codebook space vector; or a vector of the codebook space is taken directly as the codebook space vector.

Preferably, in the Step 403, selecting successively the projection vectors having a same dimension as the codebook space to obtain a codebook space vector may be that:

the projection vectors having a same dimension are selected successively as the codebook space, and each selected projection vector is normalized and orthogonalized separately to obtain the codebook space vector; or a vector of the value space or the null space is taken directly as the codebook space vector.

Preferably, the Step 404 may be that:

modulus of a product between any codebook space vector and each codeword vector in a codebook table is calculated separately, and a queue by sorting an obtained value is obtained in accordance with a sequence from large to small;

a codeword corresponding to the value at a first place of the queue is selected as a maximum codeword;

it is judged whether |the codebook space vector*a maximum codeword vector|$^2$ is larger than or equal to the preset second threshold or not, and when |the codebook space vector*the maximum codeword vector|$^2$ is less than the preset second threshold, a codeword corresponding to the value at a second place of the queue is selected from an orthogonal basis vector set in which the maximum codeword vector is located, as a second maximum codeword; a relative projection component is obtained by dividing a component of the codebook space vector on the second maximum codeword by a component of the codebook space vector on the maximum codeword; and codebook processing is performed separately on an angle and modulus of the relative projection component to obtain a quantified result;

it is judged whether |the codebook space vector*the maximum codeword vector $|^2$+|the codebook space vector*the second maximum codeword vector$|^2$ is larger than or equal to the preset second threshold or not, and when |the codebook space vector*the maximum codeword vector$|^2$+|the codebook space vector*the second maximum codeword vector$|^2$ is less than the preset second threshold, a codeword corresponding to the value at a third place of the queue is selected from the orthogonal basis vector set in which the maximum codeword is located, as a third maximum codeword;

a relative projection component of the codebook space vector on the third maximum codeword relative to the codebook space vector on the maximum codeword is calculated, and codebook processing is performed separately on an angle and modulus of the relative projection component to obtain a quantified result, until a quadratic sum of the modulus of a product between the codebook space vector and each selected codeword vector is larger than or equal to the preset second threshold;

codebook processing is performed on other codebook space vectors separately in accordance with the above steps; and a codebook index corresponding to each selected codeword vector and the quantified result of each relative projection component are fed back to the base station.

Preferably, the Step 404 may also be that:

modulus of a product between any codebook space vector and each codeword vector in a codebook table is calculated separately to obtain values, and a queue by sorting the obtained values is obtained in accordance with a sequence from large to small;

a codeword corresponding to a value at a first place of the queue is selected as a maximum codeword, and codeword quantity is set as an initial value;

it is judged whether the quantity of the selected maximum codeword reaches a preset third threshold or not, and when the third threshold is reached, a codebook index corresponding to a maximum codeword vector is fed back to the base station;

when the third threshold is not reached, a codeword corresponding to a value at a second place of the queue is selected as a second maximum codeword from an orthogonal basis vector set in which the maximum codeword is located, and the codeword quantity is added by 1; a component of the codebook space vector on the second maximum codeword is divided by a component of the codebook space vector on the maximum codeword to obtain a relative projection component; codebook processing is performed separately on an angle and modulus of the relative projection vector to obtain a quantified result;

it is judged whether the quantity of the selected maximum codeword and the second maximum codeword reaches a preset third threshold or not, and when the third threshold is not reached, a codeword corresponding to a value at the third place of the queue is selected from the orthogonal basis vector set in which the maximum codeword is located, as a third maximum codeword, and the codeword quantity is added by 1 again;

a relative projection component of the codebook space vector on the third maximum codeword relative to the codebook space vector on the maximum codeword is calculated, and codebook processing is performed separately on an angle and modulus of the relative projection component to obtain a quantified result, until the quantity of the selected codewords reaches the preset third threshold;

codebook processing is performed separately on other codebook space vectors in accordance with the above steps; and a codebook index corresponding to each selected codeword vector, and the quantified result of each relative projection component are fed back to the base station.

Figure 5:
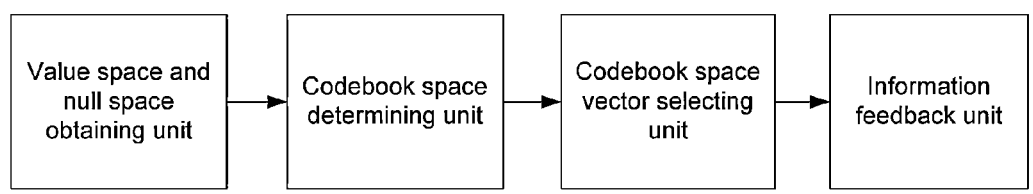
FIG. 5 is a structure schematic diagram of an embodiment of a device for performing codebook processing on channel information of the disclosure.

An embodiment of the disclosure provides a device for performing codebook processing on channel information, as shown in FIG. 5, and the device includes:

a value space and null space obtaining unit, configured to analyse channel information obtained by channel estimation, to obtain a value space and a null space;

a codebook space determining unit, configured to take a value space or a null space which has a small dimension as a codebook space;

a codebook space vector selecting unit, configured to select a codebook space vector; and an information feedback unit, configured to perform multidimensional codebook processing separately on each codebook space vector, and feed back information obtained by the codebook processing to a base station.

Preferably, the value space and null space obtaining unit is configured to:

perform svd on the channel information obtained by the channel estimation, to obtain three matrixes, namely a left singular value matrix, a right singular value matrix, and a singular value matrix; and take a vector of the right singular value matrix corresponding to a singular value in the three matrixes of which an absolute value is less than or equal to a preset first threshold as the null space, and take the vector of the right singular value matrix corresponding to the singular value in the three matrixes of which the absolute value is larger than the preset first threshold as the value space.

Preferably, the codebook space determining unit is configured to judge whether vector quantity in the value space is less than or equal to vector quantity in the null space or not, and if the vector quantity in the value space is less than or equal to the vector quantity in the null space, then to take the value space as the codebook space; if the vector quantity in the value space is larger than the vector quantity in the null space, then to take the null space as the codebook space.

Preferably, the codebook space vector selecting unit is configured to:

project each codeword vector in a codebook table to the codebook space to obtain a projection vector of each codeword vector; select successively projection vectors having a same dimension as the codebook space according to a sequence of modulus of the projection vectors from large to small, to obtain the codebook space vector; or take directly a vector of the codebook space as the codebook space vector.

Preferably, the codebook space vector selecting unit is configured to:

select successively the projection vectors having a same dimension as the codebook space, and normalize and orthogonalize each selected projection vector separately to obtain the codebook space vector.

Preferably, the information feedback unit is configured to:

calculate separately modulus of a product between any codebook space vector and each codeword vector in a codebook table to obtain values, and obtain a queue by sorting the obtained values in accordance with a sequence from large to small;

select a codeword corresponding to a value at a first place of the queue, as a maximum codeword;

judge whether |the codebook space vector*a maximum codeword vector|² is larger than or equal to a preset second threshold or not, and when |the codebook space vector*the maximum codeword vector|² is less than the preset second threshold, select a codeword corresponding to the value at a second place of the queue, from an orthogonal basis vector set in which the maximum codeword is located, as a second maximum codeword; obtain a relative projection component by dividing a component of the codebook space vector on the second maximum codeword by a component of the codebook space vector on the maximum codeword; and perform codebook processing separately on an angle and the modulus of the relative projection component to obtain a quantified result;

judge whether |the codebook space vector*the maximum codeword vector|²+|the codebook space vector*the second maximum codeword vector|² is larger than or equal to the preset second threshold or not, and when |the codebook space vector*the maximum codeword vector|²+|the codebook space vector*the second maximum codeword vector|² is less than the preset second threshold, select a codeword corresponding to a value at a third place of the queue, from the orthogonal basis vector set in which the maximum codeword is located, as a third maximum codeword;

calculate a relative projection component of the codebook space vector on the third maximum codeword relative to the codebook space vector on the maximum codeword, and perform codebook processing separately on the angle and modulus of the relative projection component to obtain a quantified result, until a quadratic sum of the modulus of a product between the codebook space vector and each selected codeword vector is larger than or equal to the preset second threshold;

perform codebook processing separately on other codebook space vectors in accordance with the above steps; and feed back a codebook index corresponding to each selected codeword vector, and the quantified result of each relative projection component to the base station.

Preferably, the information feedback unit is configured to: calculate separately modulus of a product between any codebook space vector and each codeword vector in a codebook table to obtain values, and obtain a queue by sorting the obtained values in accordance with a sequence from large to small;

select a codeword corresponding to a value at a first place of the queue, as a maximum codeword, and set codeword quantity as an initial value;

judge whether the quantity of the selected maximum codeword reaches a preset third threshold or not, and when the third threshold is reached, feed back a codebook index corresponding to a maximum codeword vector to the base station;

when the third threshold is not reached, select a codeword corresponding to a value at a second place of the queue, from an orthogonal basis vector set in which the maximum codeword is located, as a second maximum codeword, and add the codeword Quantity by 1; divide a component of the codebook space vector on the second maximum codeword by a component of the codebook space vector on the maximum codeword to obtain a relative projection component; perform codebook processing separately on an angle and modulus of the relative projection vector to obtain a quantified result;

judge whether the quantity of the selected second maximum codeword reaches a preset third threshold or not, and when the third threshold is not reached, select a codeword corresponding to a value at the third place of the queue, from the orthogonal basis vector set in which the maximum codeword is located, as a third maximum codeword, and add the codeword quantity by 1 again;

calculate a relative projection component of the codebook space vector on the third maximum codeword relative to the codebook space vector on the maximum codeword, and perform codebook processing separately on the angle and the modulus of the relative projection component to obtain a quantified result, until the quantity of selected codewords reaches the preset third threshold;

perform codebook processing separately on other codebook space vectors in accordance with the above steps; and feed back a codebook index corresponding to each selected codeword vector, and the quantified result of each relative projection component to the base station.

A second embodiment of a method for performing codebook processing on channel information provided by the disclosure includes the following steps.

Step 501 includes that channel information obtained by channel estimation is analyzed to obtain a value space and a null space;

specifically, svd is performed, namely singular value decomposition in linear algebra, on channel information obtained by channel estimation, to obtain three matrixes, namely a left singular value matrix, a right singular value matrix, and a singular value matrix; and a vector of the right singular value matrix corresponding to a singular value in the three matrixes of which an absolute value is less than or equal to a first preset threshold is taken as the null space, and a vector of the right singular value matrix corresponding to a singular value in the three matrixes of which an absolute value is larger than the preset first threshold is taken as the value space. The first threshold may be 0.

Step 502 includes that the value space or the null space of which a dimension is small is taken as a codebook space;

specifically, it is judged whether vector quantity in the value space is less than or equal to vector quantity in the null space or not, and if the vector quantity in the value space is less than or equal to the vector quantity in the null space, then the value space is taken as the codebook space; if the vector quantity in the value space is larger than the vector quantity in the null space, then the null space is taken as the codebook space; and taking the space including less vectors as the codebook space can reduce calculation amount of data, and thus reduce the amount of data sent by a UE.

Step 503 includes that each codeword vector in a codebook table is projected separately to the codebook space, to obtain a projection vector corresponding to each codeword vector;

the commonly used R8 codebook table may be adopted as the codebook table, as shown in FIG. 2, the codeword vector is a four-dimensional vector corresponding to one codebook index. In an actual application, other codebook tables, such as a codebook table having only one orthogonal basis, may also be selected.

Step 504 includes that projection vectors having a same dimension (namely quantity of independent vectors in the codebook space) are selected successively as the codebook space according to a sequence of modulus of the projection vectors from large to small, to obtain the codebook space vector.

Figure 6:
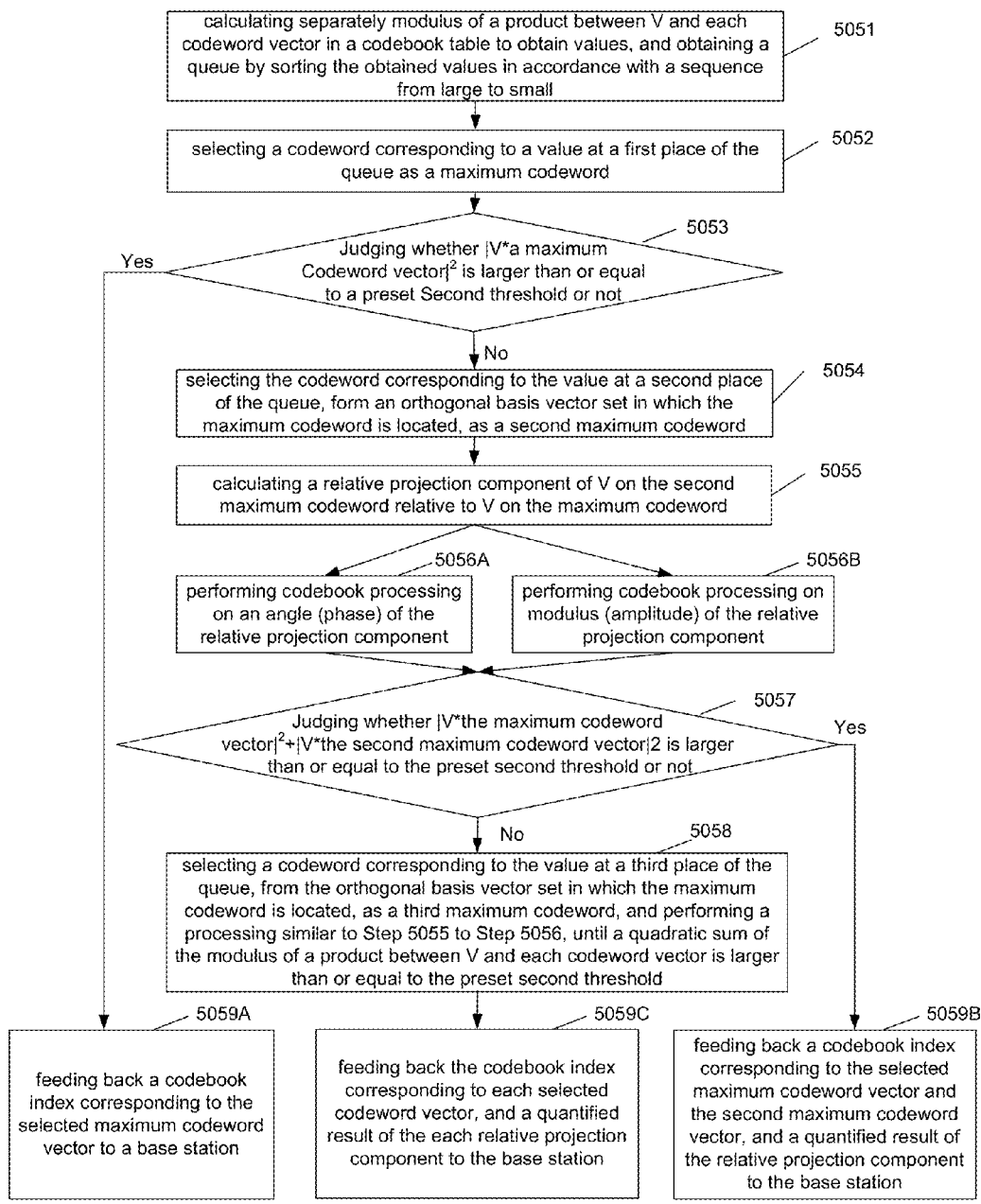
FIG. 6 is a flowchart of performing codebook processing on one codebook space vector V in a second embodiment of the method for performing codebook processing on channel information of the disclosure.

Step 505 includes that codebook processing is performed separately on each codebook space vector, and information obtained by the codebook processing is fed back to the base station;

here, as shown in FIG. 6, one codebook space vector V is taken as an example to introduce a codebook procedure:

Step S051 includes that modulus of a product between V and each codeword vector in a codebook table is calculated separately to obtain values, and a queue by sorting the obtained values is obtained in accordance with a sequence from large to small;

Step S052 includes that a codeword corresponding to a value at a first place of the queue is selected as a maximum codeword;

Step S053 includes that it is judged whether $|V*a$ maximum codeword vector$|^2$ is larger than or equal to a preset second threshold or not, and if $|C*$the maximum codeword vector$|^2$ is larger than or equal to the preset second threshold, then Step S059A is executed; if $|C*$the maximum codeword vector$|^2$ is less than the preset second threshold, then Step S054 is executed;

Step S054 includes that a codeword corresponding to a value at a second place of the queue is selected from an orthogonal basis vector set in which the maximum codeword is located, with reference to FIG. 8, as a second maximum codeword;

Step S055 includes that a relative projection component of V on the second maximum codeword relative to V on the maximum codeword is calculated;

specifically, the relative projection component is obtained by calculation according to Formula (1);

the relative projection component=($V*$the second maximum codeword vector)/($V*$the maximum codeword vector)  Formula (1)

Step S056A includes that codebook processing is performed on an angle (phase) of the relative projection component;

specifically, the codebook processing is performed on the angle of the relative projection component in accordance with Table (1),

TABLE (2)

|  | Amplitude value | |
| --- | --- | --- |
|  | 0~a fourth threshold | larger than the fourth threshold |
| Index value | 0 | 1 |

The above Table (1) and Table (2) may also adopt other scale, for example increasing scale or reducing scale according to a requirement;

Step S057 includes that it is judged whether $|V*$the maximum codeword vector$|^2+|V*$the second maximum codeword vector$|^2$ is larger than or equal to the preset second threshold or not, if larger, then Step S059B is executed; otherwise, Step S058 is executed;

Step S058 includes that the codeword corresponding to the value at a third place of the queue is selected from the orthogonal basis vector set in which the maximum codeword is located, as a third maximum codeword, and processing similar to Step S055 to Step S056 is performed until a quadratic sum of the modulus of a product between V and each codeword vector is larger than or equal to the preset second threshold, and then Step S059C is executed;

Step S059A includes that a codebook index corresponding to the vector of the selected maximum codeword is fed back to a base station, and this procedure is ended;

Step S059B includes that the codebook indexes corresponding to the vector of the selected maximum codeword and to the second maximum codeword vector, and a quantified result of the relative projection component are fed back to the base station, and this procedure is ended; and Step S059C includes that the codebook index corresponding to each selected codeword vector, and a quantified result of the each relative projection component are fed back to the base station, and this procedure is ended.

A third embodiment of the method for performing codebook processing on channel information provided by the disclosure includes the following steps:

Step 601 includes that channel information obtained by channel estimation is analysed to obtain a value space and a null space;

specifically, svd, namely singular value decomposition in linear algebra, is performed on channel information obtained

TABLE (1)

|  | Phase value | | | | | | | |
| --- | --- | --- | --- | --- | --- | --- | --- | --- |
|  | −1/8 π~1/8 π | 1/8 π~3/8 π | 3/8 π~5/8 π | 5/8 π~7/8 π | 7/8 π~9/8 π | 9/8 π~11/8 π | 11/8 π~13/8 π | 13/8 π~15/8 π |
| Index value | 0 | 1 | 2 | 3 | 4 | 5 | 6 | 7 |

Step S056B includes that codebook processing is performed on modulus (amplitude) of the relative projection component;

specifically, the codebook processing is performed on the modulus of the relative projection component according to Table (2), and a fourth threshold may be 0.5;

by channel estimation to obtain three matrixes, namely a left singular value matrix, a right singular value matrix, and a singular value matrix; and a vector of the right singular value matrix corresponding to a singular value in the three matrixes of which an absolute value is less than or equal to a preset first threshold is taken as the null space, and the vector of the right singular value matrix corresponding to the singular value in the three matrixes of which the absolute value is larger than the preset first threshold is taken as the value space. The first threshold may be 0;

Step 602 includes that the value space or the null space of which a dimension is small is taken as a codebook space;

specifically, it is judged whether vector quantity in the value space is less than or equal to vector quantity in the null space or not, and if the vector quantity in the value space is less than or equal to the vector quantity in the null space, then the value space is taken as the codebook space; if the vector quantity in the value space is larger than the vector quantity in the null space, then the null space is taken as the codebook space; and taking the space including less vectors as the codebook space can reduce calculation amount of data, thus reduce amount of data sent by a UE;

Step 603 includes that each codeword vector in a codebook table is projected separately to the codebook space, to obtain a projection vector corresponding to each codeword vector;

the commonly used R8 codebook table may be adopted as the codebook table, as shown in FIG. 2, the codeword vector is a four-dimensional vector corresponding to one codebook index. In an actual application, other codebook tables, such as a codebook table having only one orthogonal basis, may also be selected;

Step 604 includes that projection vectors having a same dimension (quantity of independent vectors in the codebook space) are selected successively as the codebook space according to a sequence of modulus of the projection vectors from large to small, to obtain the codebook space vector; and Step 605 includes that codebook processing is performed separately on each codebook space vector, and information obtained by the codebook processing is fed back to the base station.

Figure 7:
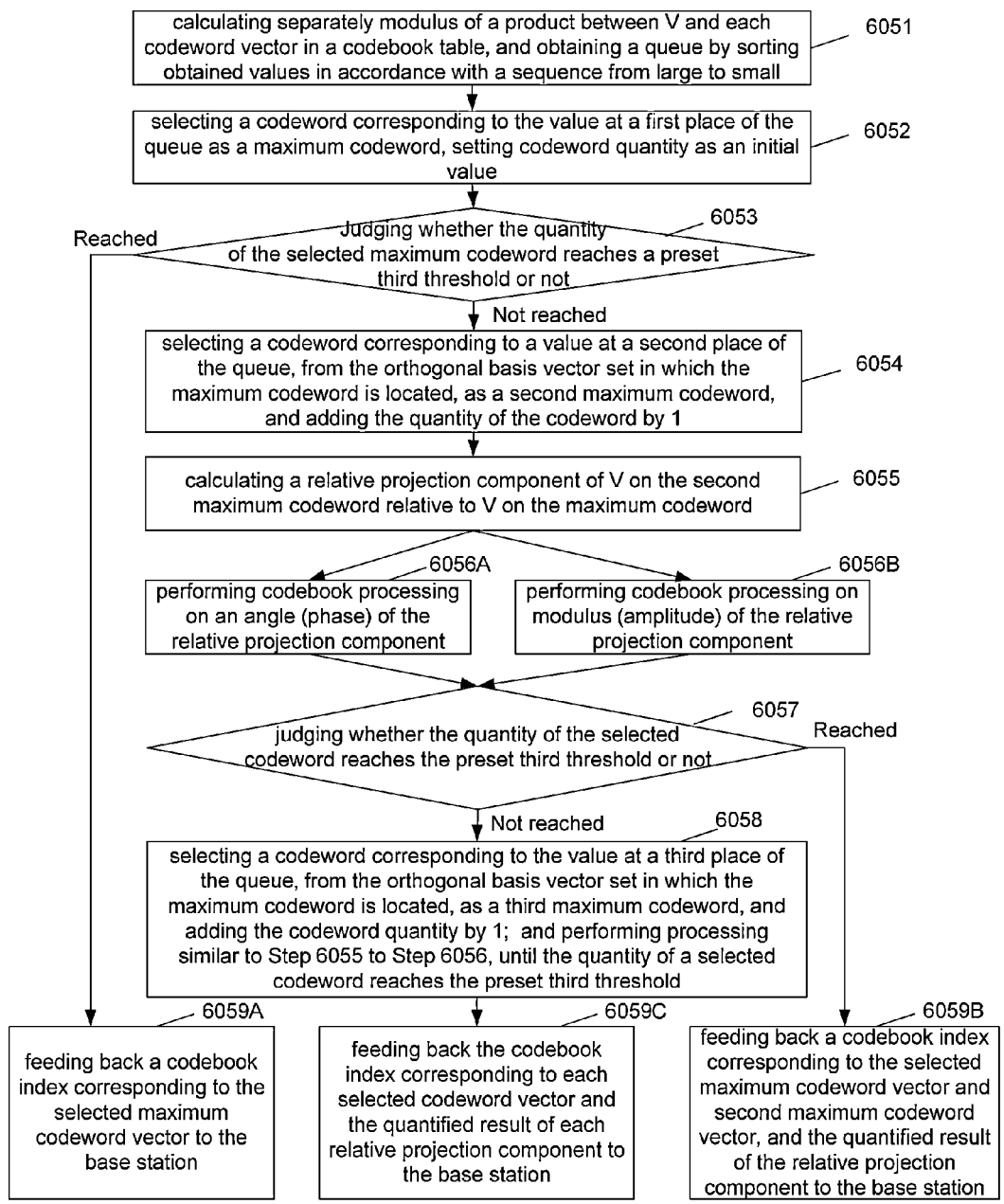
FIG. 7 is a flowchart of performing codebook processing on one codebook space vector V in a third embodiment of the method for performing codebook processing on channel information of the disclosure.

Here, as shown in FIG. 7, a codebook space vector V is taken as an example to introduce a codebook procedure:

Step 6051 includes that modulus of a product between V and each codeword vector in a codebook table is calculated separately to obtain values, and a queue by sorting the obtained values is obtained in accordance with a sequence from large to small;

Step 6052 includes that a codeword corresponding to the value at a first place of the queue is selected as a maximum codeword, and codeword quantity is set as an initial value; for example the initial value may be 1;

Step 6053 includes that it is judged whether the quantity of the selected maximum codeword reaches a preset third threshold or not, and when the third threshold is reached, then Step 6059A is executed; when the third threshold is not reached, then Step 6054 is executed;

here, the third threshold may be set as 2;

Step 6054 includes that a codeword corresponding to the value at a second place of the queue is selected from the orthogonal basis vector set in which the maximum codeword is located, as a second maximum codeword, and the codeword quantity is added by 1;

Step 6055 includes that a relative projection component of V on the second maximum codeword relative to V on the maximum codeword is calculated;

specifically, the relative projection component is obtained by calculation according to Formula (1);

Step 6056A includes that codebook processing is performed on an angle of the relative projection component;

specifically, the codebook processing is performed on the angle of the relative projection component in accordance with Table (1);

Step 6056B includes that codebook processing is performed on modulus of the relative projection component;

specifically, the codebook processing is performed on the modulus of the relative projection component according to Table (2), wherein the third threshold may be 0.5;

The above Table (1) and Table (2) may also adopt other scale, for example the scale is increased or reduced according to a requirement;

Step 6057 includes that it is judged whether the quantity of the selected codewords reaches the preset third threshold or not, and if the third threshold is reached, then Step 6059B is executed; if the third threshold is not reached, then Step 6058 is executed;

Step 6058 includes that a codeword corresponding to the value at a third place of the queue is selected from the orthogonal basis vector set in which the maximum codeword is located, as a third maximum codeword, and the codeword quantity is added by 1 again; and processing similar to Step 6055 to Step 6056 is performed until the quantity of selected codewords reaches the preset third threshold, then Step 6059C is executed;

Step 6059A includes that a codebook index corresponding to the vector of the selected maximum codeword is fed back to the base station, and this procedure is ended;

Step 6059B includes that a codebook index corresponding to the vector of the selected maximum codeword and to the vector of the second maximum codeword vector, and the quantified result of the relative projection component are fed back to the base station, and this procedure is ended; and Step 6059C includes that the codebook index corresponding to the vector of each selected codeword and the quantified result of each relative projection component are fed back to the base station, and this procedure is ended.

The embodiment of the disclosure is explained below in combination with a specific application scene.

Embodiment 4

An application scene of this embodiment is a scene having three cells and three user equipments, wherein BBU1, BBU2, and BBU3 separately denote three base stations; UE1, UE2, and UE3 separately denote three user equipments.

UE1 belongs to BBU1 and is interfered by a downlink signal of BBU2 and BBU3; UE2 belongs to BBU2 and is interfered by a downlink signal of BBU1 and BBU3; UE3 belongs to BBU3 and is interfered by a downlink signal of BBU1 and BBU2;

this embodiment uses R8 codebook;

the second threshold is 0.85; the forth threshold is 0.5;

channel information is [−1.0130−0.8764i−0.9997+0.5156i−0.2155+0.4662i −1.5605−3.1371i].

Step 701 includes that channel information obtained by channel estimation is analysed to obtain a value space and a null space;

the value space is:
−0.2565+0.2219i
−0.2531−0.1305i
−0.0546−0.1180i
−0.3951+0.7943i
the null space is:
−0.1931+0.2093i−0.0108+0.1296i−0.6433−0.6109i
0.9374+0.0111i−0.0195+0.0215i−0.0316−0.1955i
−0.0257−0.0136i 0.9869+0.0023i 0.0435−0.0793i
0.0373+0.1945i 0.0680+0.0596i 0.3926+0.1073i.

Step 702 includes that the value space or the null space of which a dimension is small is taken as a codebook space;

in this embodiment, the value space has 1 dimension, and the null space has 3 dimensions, therefore the value space is selected as the codebook space.

Step 703 includes that each codeword vector in the codebook table is projected separately to the codebook space, to obtain the projection vector of each codeword vector.

Step 704 includes that the projection vectors having a same dimension (namely the quantity of independent vectors in the codebook space is the same) are selected successively as the codebook space according to a sequence of modulus of the projection vectors from large to small, to obtain the codebook space vector;

in this embodiment, since the value space has only 1 dimension, only one codebook space vector V is obtained finally, V=[−0.2565+0.2219i
−0.2531−0.1305i
−0.0546−0.1180i
−0.3951+0.7943i].

Step 705 includes that modulus of a product between V and each codeword vector in the codebook is calculated separately, and obtain

[0.6143 0.5720 0.3268 0.4344 0.1057 0.6502 0.5279 0.5363 0.2940 0.4153 0.6553 0.5582 0.4191 0.6577 0.5620 0.2757].

Step 706 includes that the codeword $[0.5, 0.5, -0.5, 0.5]^H$ corresponding to a value having the maximum modulus is selected as the maximum codeword.

Step 707 includes that the value of $|V*\text{the maximum codeword vector}|^2$ is calculated;

0.43 is obtained, which is less than the preset second threshold 0.85.

Step 708 includes that the codeword $[0.5, -0.5, 0.5, 0.5]^H$ of which the modulus is only smaller than the maximum codeword is taken as the second maximum codeword from an orthogonal basis vector set {12 13 14 15 } in which the maximum codeword is located, as shown in FIG. 8.

Step 709 includes that a relative projection component F1 of V on the second maximum codeword relative to V on the maximum codeword is calculated according to Formula (1);

F1 is obtained which is 0.8194−0.2426i; the modulus (amplitude) of F1 is 0.8546, and the angle (phase) of F1 is −0.0916π.

Step 710 includes that codebook processing is performed on the angle of F1 in accordance with Table (1), and codebook processing is performed on the modulus of F1 according to Table (2).

It is obtained that the quantified result of the angle of F1 is 0, and the quantified result of the modulus of F1 is 1.

Step 711 includes that the value of $|V*\text{the maximum codeword vector}|^2+|V*\text{the second maximum codeword vector}|^2$ is calculated;

0.75 is obtained, which is less than the preset threshold 0.85.

Step 712 includes that the codeword $[0.5, 0.5, 0.5, -0.5]^H$ of which the modulus is only smaller than the second maximum codeword is taken, from the orthogonal basis vector set {12 13 14 15} in which the maximum codeword is located, as shown in FIG. 8, as the third maximum codeword.

Step 713 includes that a projection component F2 of V on the third maximum codeword relative to V on the maximum codeword is calculated according to F2=(V*the vector of the third maximum codeword)/(V*the maximum codeword vector);

it is obtained that F2 is −0.3932+0.5015i, the modulus of F2 is 0.6372, and the angle of F2 is 0.7116π.

Step 714 includes that codebook processing is performed on the angle of F2 in accordance with Table (1), and codebook processing is performed on the modulus of F2 according to Table (2).

It is obtained that the quantified result of the angle of F2 is 3, and the quantified result of the modulus of F2 is 1.

Step 715 includes that the value of $|V*\text{the maximum codeword vecrtor}|^2+|V*\text{the second maximum codeword vector}|^2+|V*\text{the third maximum codeword vecrtor}|^2$ is calculated;

0.92 is obtained, which is larger than the preset second threshold 0.85.

Step 716 includes that the codebook index 13, 14, and 12 corresponding to the vector of the selected maximum codeword, the second maximum codeword vector, and the vector of the third maximum codeword, and the quantified result 0 and 1 of F1 and the quantified result 3 and 1 of F1 are fed back to the base station, and this procedure is ended.

FIG. 3 is a schematic diagram of COMP gain obtained by adopting an existing method for feeding back multiple codewords; FIG. 9 is a schematic diagram of COMP gain obtained by adopting a forth embodiment of the disclosure. It is known by comparing FIG. 3 and FIG. 9 that, the COMP gain obtained by adopting the forth embodiment of the disclosure is increased by 3~4 times if compared with the COMP gain obtained by adopting an existing method for feeding back multiple codewords, and thus the codebook precision can be improved effectively by adopting the embodiment of the disclosure, thus the COMP gain is improved.

Figure 10:
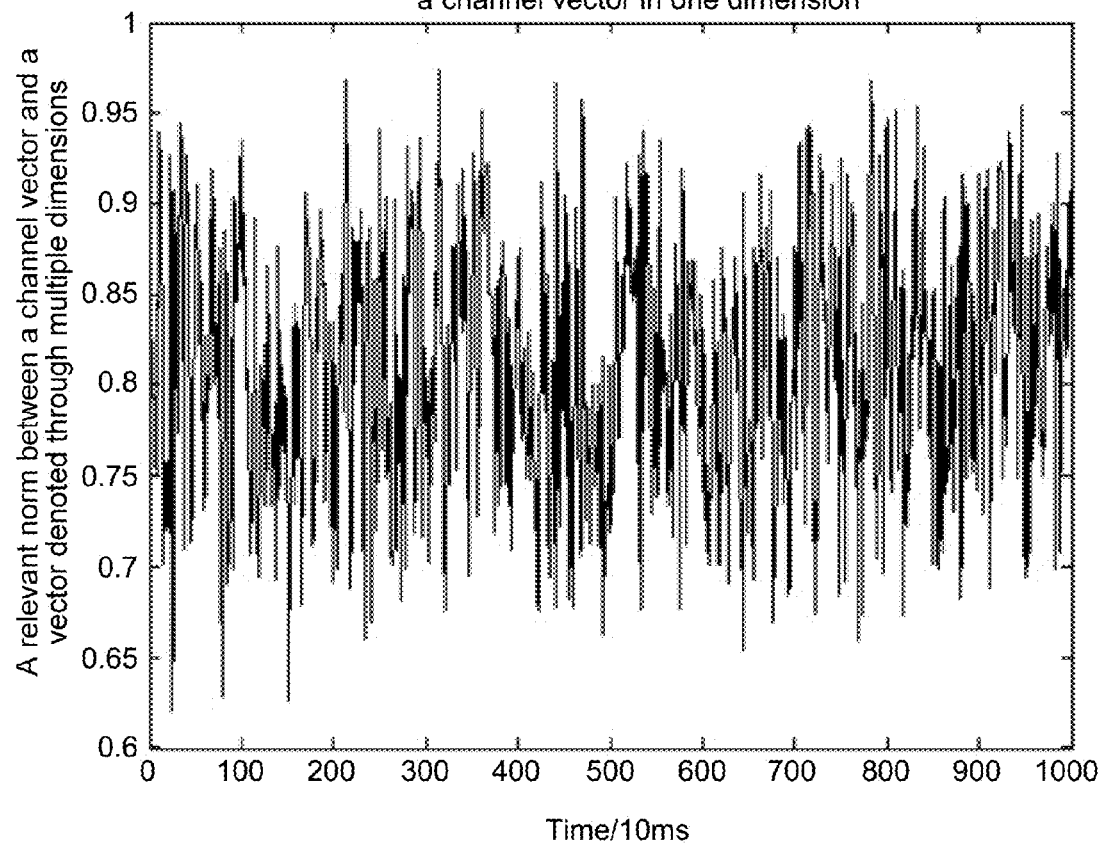
FIG. 10 is a schematic diagram of accuracy of measuring a channel vector in one dimension.
Figure 11:
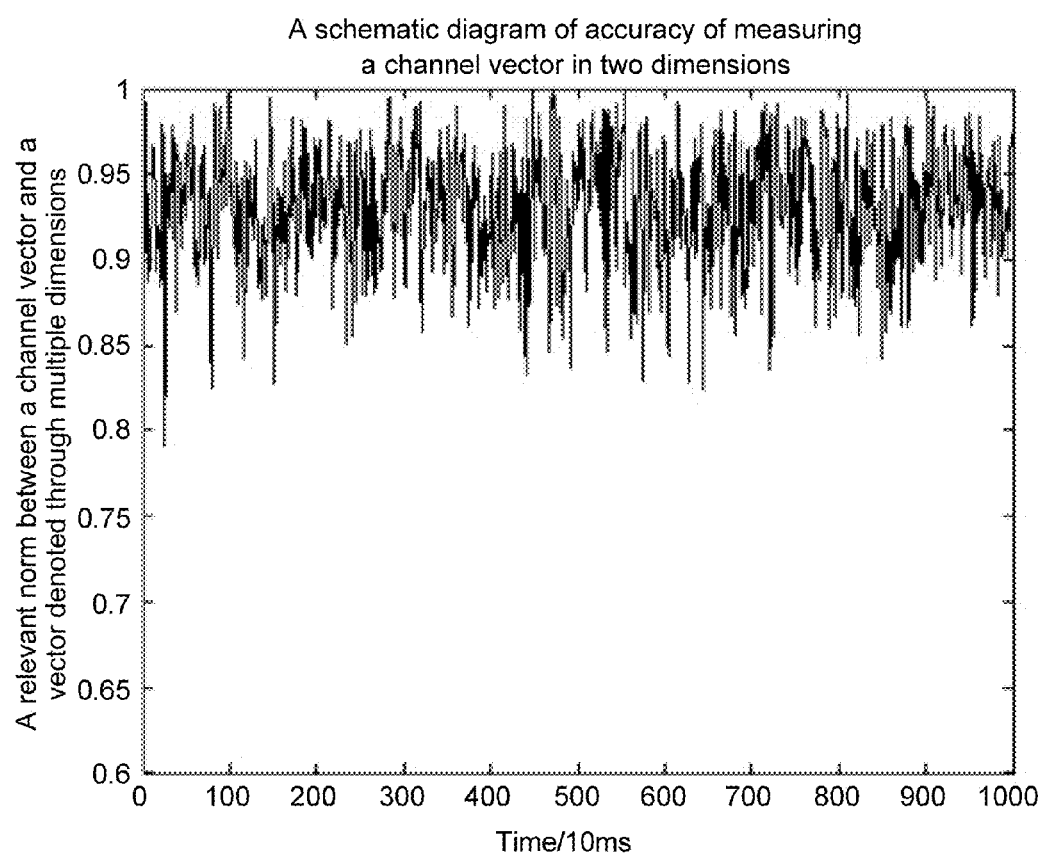
FIG. 11 is a schematic diagram of accuracy of measuring channel vectors in two dimensions.

FIG. 10 is a schematic diagram of accuracy of measuring a channel vector in one dimension; FIG. 11 is a schematic diagram of accuracy of measuring channel vectors in two dimensions; it is known by comparing FIG. 10 and FIG. 11 that, the codebook precision can be greatly improved through multi-dimensional codebook processing, and the error after quantification becomes smaller.

Embodiment 5

An application scene of this embodiment is a scene having three cells and three user equipments, wherein BBU1, BBU2, and BBU3 separately denote three base stations; UE1, UE2, and UE3 separately denote three user equipments.

UE1 belongs to BBU1 and is interfered by a downlink signal of BBU2 and BBU3; UE2 belongs to BBU2 and is interfered by a downlink signal of BBU1 and BBU3; UE3 belongs to BBU3 and is interfered by a downlink signal of BBU1 and BBU2;

this embodiment uses a R8 codebook;

the second threshold is 0.85; the forth threshold is 0.5;

channel information is [1.3851+0.9739i−0.3862−0.0661i 0.2997−0.2379i 0.1704+1.0184i−1.1916−0.3150i−1.4236−0.6283i−0.7174+0.7819i−0.2367−0.9114i].

Step 801 includes that channel information obtained by channel estimation is analysed to obtain a value space and a null space;

the value space is:
−0.5732+0.4044i−0.3540+0.2469i
−0.2315+0.2912i 0.6820−0.4918i
−0.3284−0.1851i 0.2280+0.0683i
−0.0085+0.4768i−0.1361+0.1778i
the null space is:
−0.0766+0.2207i−0.3319−0.3962i
−0.1797+0.3305i 0.0472−0.1042i
0.8911+0.0205i 0.0414−0.0705i
0.0798+0.0548i 0.8435+0.0397i.

Step 802 includes that the value space or the null space of which a dimension is small is taken as a codebook space;

in this embodiment, both the value space and the null space are 2 dimensional, and the value space is selected to perform codebook processing in this embodiment.

Step 803 includes that each codeword vector in the codebook table is projected separately to the codebook space, to obtain the projection vector of each codeword vector.

Step 804 includes that the projection vectors having a same dimension (the quantity of independent vectors in the codebook space is the same) are selected successively as the codebook space, according to a sequence of modulus of the projection vectors from large to small, and each selected projection vector is normalized and orthogonalized separately to obtain the codebook space vector;

the value space is 2 dimensional, therefore two codebook space vectors are finally obtained, which are a first codebook space vector V1 and a second codebook space vector V2 separately; wherein, V1=[0.5798−0.1779i
0.0452−0.6201i
0.3463+0.0629i
0.0698−0.3419i];
V2=[0.4767+0.2886i
−0.6458+0.2046i
−0.2711−0.0374i
0.3946+0.0010i].

Step 805A includes that modulus of a product between V1 and each codeword vector in the codebook is calculated separately, obtaining [0.7490 0.1103 0.5864 0.2882 0.4020 0.1596 0.6814 0.5905 0.2797 0.1164 0.1304 0.9440 0.4917 0.6261 0.4823 0.3655].

Step 806A includes that the codeword [0.5, 0−0.5i, 0.5, 0−0.5i]$^H$ corresponding to a value having the maximum modulus is selected as the maximum codeword A1 of V1.

Step 807A includes that the value of |V1*A1 vector|$^2$ is calculated, and 0.89 is obtained;

this value is larger than the preset second threshold 0.85.

Step 808B includes that modulus of a product between V2 and each codeword vector in the codebook is calculated separately;

obtaining [0.2295 0.8325 0.2295 0.4490 0.4471 0.6981 0.5284 0.1837 0.3025 0.3246 0.8962 0.0000 0.4753 0.3638 0.6234 0.5031].

Step 809B includes that the codeword [0.5, −0.5, −0.5, 0.5]$^H$ corresponding to a value having the maximum modulus is selected as the maximum codeword A2 of V2.

Step 810B includes that the value of |V2*A2 vector|$^2$ is calculated;

and 0.80 is obtained, which is less than the preset second threshold 0.85.

Step 811B includes that the codeword [0.5, 0+0.5i, 0.5, 0+0.5i]$^H$ of which the modulus is only smaller than the maximum codeword A2 is taken from an orthogonal basis vector set {8 9 10 11} in which the maximum codeword A2 of V2 is located, as shown in FIG. 8, as the second maximum codeword B2.

Step 812B includes that a relative projection component F of V2 on the second maximum codeword B2 relative to V2 on the maximum codeword A2 is calculated according to Formula (1);

it is obtained that F is 0.2480+0.2639i, the modulus of F is 0.36, and the angle of F is 0.26π.

Step 813B includes that codebook processing is performed on the angle of F in accordance with Table (1), codebook processing is performed on the modulus of F according to Table (2);

it is obtained that the quantified result of the angle of F is 0, and the quantified result of the modulus of F is 1.

Step 814B includes that |V*A2 codeword vector|$^2$+|V*B2 codeword vector|$^2$ is calculated and 0.91 is obtained;

this value is larger than the preset second threshold 0.85.

Step 815 includes that the codebook index 11, 10, and 9 corresponding to the selected maximum codeword vector A1 of V1, the maximum codeword vector A2 of V2, and the second maximum codeword vector B2 of V2, and the quantified result 0 and 1 of F are fed back to the base station, and this procedure is ended.

Embodiment 6

An application scene of this embodiment is a scene having three cells and three user equipments, wherein BBU1, BBU2, and BBU3 separately denote three base stations; UE1, UE2, and UE3 separately denote three user equipments.

UE1 belongs to BBU1, and is interfered by a downlink signal of BBU2 and BBU3; UE2 belongs to BBU2, and is interfered by a downlink signal of BBU1 and BBU3; UE3 belongs to BBU3, and is interfered by a downlink signal of BBU1 and BBU2;

this embodiment uses a R8 codebook;

the preset second threshold is 0.85; the forth threshold is 0.5;

channel information is [0.1645+4.2799i, 0.1860+3.1615i, 2.6395+0.8155i, −2.4544+1.9034i].

Step 901 includes that channel information obtained by channel estimation is analysed to obtain a value space and a null space;

the value space is:
[0.0243−0.6334i
0.0275−0.4679i
0.3907−0.1207i
−0.3633−0.2817i]
the null space is:
[−0.4309−0.1844i −0.2825+0.2956i −0.0897−0.4508i
0.8449+0.0959i 0.0309+0.1561 −0.1636−0.0723i
−0.1258−0.0974i 0.8819+0.0730i 0.0090−0.1558i
−0.0084+0.1787i 0.1434+0.0616i 0.8508+0.0923i]

Step 902 includes that the value space or the null space of which a dimension is small is taken as a codebook space;

in this embodiment, the value space is 1 dimensional and the null space is 3 dimensional, and the value space is selected to perform the codebook processing in this embodiment.

Step 903 includes that each codeword vector in the codebook table is projected separately to the codebook space, to obtain the projection vector of each codeword vector.

Step 904 includes that the projection vectors having a same dimension (dimension means the quantity of independent vectors in the codebook space) are selected successively as the codebook space according to a sequence of modulus of the projection vectors from large to small, to obtain the codebook space vector;

in this embodiment, the value space is 1 dimensional, therefore only one codebook space vector V can be obtained finally, V=[0.0243−0.6334i
0.0275−0.4679i
0.3907−0.1207i
−0.3633−0.2817i].

Step 905 includes that modulus of a product between V and each codeword vector in the codebook is calculated separately, obtaining [0.7529 0.5295 0.3754 0.1088 0.4914 0.3367 0.5704 0.5656 0.3497 0.2679 0.4123 0.7975 0.6192 0.7222 0.2842 0.1194].

Step 906 includes that the codeword [0.5, 0−0.5i, 0.5, 0−0.5i]$^H$ corresponding to a value having the maximum modulus is selected as the maximum codeword.

Step 907 includes that the value of |V*the maximum codeword vector|² is calculated, obtaining 0.6360;

this value is less than the preset second threshold 0.8.

Step 908 includes that the codeword $[0.5, -0.5, -0.5, 0.5]^H$ of which the modulus is smaller than the maximum codeword only is taken from an orthogonal basis vector set {8 9 10 11} in which the maximum codeword is located, as shown in FIG. 8, as the second maximum codeword.

Step 909 includes that a relative projection component F of V on the second maximum codeword relative to V on the maximum codeword is calculated according to Formula (1);

it is obtained that F is −0.2067−0.4738i, the modulus of F is 0.517, and the angle of F is 1.37π.

Step 910 includes that codebook processing is performed on the angle of F in accordance with Table (3), and codebook processing is performed on the modulus of F cording to Table (2).

It is obtained that the quantified result of the angle of F is 3, and the quantified result of the modulus of F is 1.

TABLE (3)

| | Phase value | | | |
|---|---|---|---|---|
| | −⅛π~⅛π | ⅛π~⅜π | ⅜π~⅝π | ⅝π~⅞π |
| Index value | 0 | 1 | 2 | 3 |

Step 911 includes that the value of |V*the maximum codeword vector|²+|V*the second maximum codeword vector|² is calculated, and 0.806 is obtained;

this value is larger than the preset second threshold 0.8.

Step 912 includes that the codebook index 11 and 10 corresponding to the selected maximum codeword vector and the second maximum codeword vector, and the quantified result 3 and 1 of F are fed back to the base station, and this procedure is ended.

With regard to vector*vector, the first vector is a row vector, and the second vector is a column vector. If the above condition is not met, then the vector is transposed to meet the above condition.

All those described above are only embodiments of the disclosure and are not used to limit the protection scope of the disclosure.

What is claimed is:

1. A method for performing codebook processing on channel information, comprising:
   analyzing the channel information obtained by channel estimation, to obtain a value space and a null space;
   taking the value space or the null space which has a small dimension as a codebook space;
   selecting one or more codebook space vectors; and
   performing multidimensional codebook processing separately on each of the one or more codebook space vectors, and feeding back information obtained by the codebook processing to a base station;
   wherein obtaining the value space and the null space comprises:
   performing singular value decomposition (svd) on the channel information obtained by the channel estimation, to obtain three matrixes which respectively are a left singular value matrix, a right singular value matrix, and a singular value matrix; and
   taking a vector of the right singular value matrix corresponding to a singular value in the three matrixes of which an absolute value is less than or equal to a preset first threshold as the null space, and taking a vector of the right singular value matrix corresponding to a singular value in the three matrixes of which an absolute value is larger than the preset first threshold as the value space;
   wherein taking the value space or the null space which has the small dimension as the codebook space comprises:
   judging whether vector quantity in the value space is less than or equal to vector quantity in the null space or not; if the vector quantity in the value space is less than or equal to the vector quantity in the null space, then taking the value space as the codebook space; and if the vector quantity in the value space is larger than the vector quantity in the null space, then taking the null space as the codebook space.

2. The method according to claim 1, wherein selecting the one or more codebook space vectors comprises:
   projecting each of codeword vectors in a codebook table to the codebook space, to obtain a projection vector of each the of codeword vectors; and selecting successively projection vectors having a same dimension as the codebook space according to a sequence of modulus of the projection vectors from large to small, to obtain the one or more codebook space vectors; or
   taking directly a vector of the codebook space as the one codebook space vector.

3. The method according to claim 2, wherein obtaining the one or more codebook space vectors comprises:
   selecting successively the projection vectors having the same dimension as the codebook space, and normalizing and orthogonalizing each selected projection vector separately to obtain the more codebook space vectors.

4. The method according to claim 2, wherein performing separately multidimensional codebook processing on each of the one or more codebook space vectors, and feeding back the information obtained by the codebook processing to the base station comprise:
   step a: calculating separately modulus of a product between one of the one or morearw codebook space vectors and each of codeword vectors in a codebook table to obtain values, and obtaining a queue by sorting the obtained values in accordance with a sequence from large to small;
   step b: selecting a codeword corresponding to a value at a first place of the queue as a maximum codeword;
   step c: judging whether |one of the one or more codebook space vectors*a maximum codeword vector|² is larger than or equal to a preset second threshold or not; when |one of the one or more codebook space vectors*the maximum codeword vector|² is less than the preset second threshold, selecting, from an orthogonal basis vector set in which the maximum codeword is located, a codeword corresponding to a value at a second place of the queue as a second maximum codeword; obtaining a relative projection component by dividing a component of one of the one or more codebook space vectors on the second maximum codeword by a component of one of the one or more codebook space vectors on the maximum codeword; and performing codebook processing separately on an angle and modulus of the relative projection component to obtain a quantified result;
   step d: judging whether |one of the one or more codebook space vectors*the maximum codeword vector|²+|one of the one or more codebook space vectors*the second maximum codeword vector|² is larger than or equal to the preset second threshold or not; when |one of the one or more codebook space vectors*the maximum codeword vector|²+|one of the one or more codebook space vectors*the second maximum codeword vector|² is less than the preset second threshold, and selecting, from the orthogonal basis vector set in which the maximum codeword is located, a codeword corresponding to a value at a third place of the queue as a third maximum codeword;

step e: calculating a relative projection component of one of the one or more codebook space vectors on the third maximum codeword relative to one of the one or more codebook space vectors on the maximum codeword, and performing codebook processing separately on an angle and modulus of the relative projection component to obtain a quantified result, until a quadratic sum of modulus of a product between one of the one or more codebook space vectors and each of selected codeword vectors is larger than or equal to the preset second threshold;

performing codebook processing separately on other of the more codebook space vectors in accordance with the steps a-e; and feeding back a codebook index corresponding to each of the selected codeword vectors, and the quantified result of each relative projection component to the base station.

5. The method according to claim 2, wherein performing multidimensional codebook processing separately on each of the one or more codebook space vectors, and feeding back the information obtained by the codebook processing to the base station comprise:

step A: calculating separately modulus of a product between one of the one or more codebook space vectors and each of codeword vectors in a codebook table to obtain values, and obtaining a queue by sorting the obtained values in accordance with a sequence from large to small;

step B: selecting a codeword corresponding to a value at a first place of the queue as a maximum codeword, and setting codeword quantity as an initial value;

step C: judging whether quantity of the selected maximum codeword reaches a preset second threshold or not, and when the preset second threshold is reached, feeding back a codebook index corresponding to a maximum codeword vector to the base station;

step D: when the preset second threshold is not reached, selecting, from an orthogonal basis vector set in which the maximum codeword is located, a codeword corresponding to a value at a second place of the queue as a second maximum codeword, and adding the codeword quantity by 1; dividing a component of one of the one or more codebook space vectors on the second maximum codeword by a component of one of the one or more codebook space vectors on the maximum codeword to obtain a relative projection component; and performing codebook processing separately on an angle and modulus of the relative projection vector to obtain a quantified result;

step E: judging whether quantity of the selected second maximum codeword reaches the preset second threshold or not, and when the preset second threshold is not reached, selecting, from the orthogonal basis vector set in which the maximum codeword is located, a codeword corresponding to a value at a third place of the queue as a third maximum codeword, and adding the codeword quantity by 1 again;

step F: calculating a relative projection component of one of the one or more codebook space vectors on the third maximum codeword relative to one of the one or more codebook space vectors on the maximum codeword, and performing codebook processing separately on an angle and modulus of the relative projection component to obtain a quantified result, until quantity of a selected codeword reaches the preset second threshold;

performing codebook processing separately on other of the more codebook space vectors in accordance with the steps A-F; and feeding back a codebook index corresponding to each of selected codeword vectors, and the quantified result of each relative projection component to the base station.

6. The method according to claim 1, wherein performing separately multidimensional codebook processing on each of the one or more codebook space vectors, and feeding back the information obtained by the codebook processing to the base station comprise:

step a: calculating separately modulus of a product between one of the one or more codebook space vectors and each of codeword vectors in a codebook table to obtain values, and obtaining a queue by sorting the obtained values in accordance with a sequence from large to small;

step b: selecting a codeword corresponding to a value at a first place of the queue as a maximum codeword;

step c: judging whether |one of the one or more codebook space vectors*a maximum codeword vector|$^2$ is larger than or equal to a preset second threshold or not; when |one of the one or more codebook space vectors*the maximum codeword vector|$^2$ is less than the preset second threshold, selecting, from an orthogonal basis vector set in which the maximum codeword is located, a codeword corresponding to a value at a second place of the queue as a second maximum codeword; obtaining a relative projection component by dividing a component of one of the one or more codebook space vectors on the second maximum codeword by a component of one of the one or more codebook space vectors on the maximum codeword; and performing codebook processing separately on an angle and modulus of the relative projection component to obtain a quantified result;

step d: judging whether |one of the one or more codebook space vectors*the maximum codeword vector|$^2$+|one of the one or more codebook space vectors*a second maximum codeword vector|$^2$ is larger than or equal to the preset second threshold or not; when |one of the one or more codebook space vectors*the maximum codeword vector|$^2$+|one of the one or more codebook space vectors*the second maximum codeword vector|$^2$ is less than the preset second threshold, and selecting, from the orthogonal basis vector set in which the maximum codeword is located, a codeword corresponding to a value at a third place of the queue as a third maximum codeword;

step e: calculating a relative projection component of one of the one or more codebook space vectors on the third maximum codeword relative to one of the one or more codebook space vectors on the maximum codeword, and performing codebook processing separately on an angle and modulus of the relative projection component to obtain a quantified result, until a quadratic sum of modulus of a product between one of the one or more codebook space vectors and each of selected codeword vectors is larger than or equal to the preset second threshold;

performing codebook processing separately on other of the more codebook space vectors in accordance with the steps a-e; and feeding back a codebook index corresponding to each of the selected codeword vectors, and the quantified result of each relative projection component to the base station.

7. The method according to claim 1, wherein performing multidimensional codebook processing separately on each of the one or more codebook space vectors, and feeding back the information 15 obtained by the codebook processing to the base station comprise:
- step A: calculating separately modulus of a product between one of the one or more codebook space vectors and each of codeword vectors in a codebook table to obtain values, and obtaining a queue by sorting the obtained values in accordance with a sequence from large to small;
- step B: selecting a codeword corresponding to a value at a first place of the queue as a maximum codeword, and setting codeword quantity as an initial value;
- step C: judging whether quantity of the selected maximum codeword reaches a preset second threshold or not, and when the preset second threshold is reached, feeding back a codebook index corresponding to a maximum codeword vector to the base station;
- step D: when the preset second threshold is not reached, selecting, from an orthogonal basis vector set in which the maximum codeword is located, a codeword corresponding to a value at a second place of the queue as a second maximum codeword, and adding the codeword quantity by 1; dividing a component of one of the one or more codebook space vectors on the second maximum codeword by a component of one of the one or more codebook space vectors on the maximum codeword to obtain a relative projection component; and performing codebook processing separately on an angle and modulus of the relative projection vector to obtain a quantified result;
- step E: judging whether quantity of the selected second maximum codeword reaches the preset second threshold or not, and when the preset second threshold is not reached, selecting, from the orthogonal basis vector set in which the maximum codeword is located, a codeword corresponding to a value at a third place of the queue as a third maximum codeword, and adding the codeword quantity by 1 again;
- step F: calculating a relative projection component of one of the one or more codebook space vectors on the third maximum codeword relative to one of the one or more codebook space vectors on the maximum codeword, and performing codebook processing separately on an angle and modulus of the relative projection component to obtain a quantified result, until quantity of a selected codeword reaches the preset second threshold;
- performing codebook processing separately on other of the more codebook space vectors in accordance with the steps A-F; and
- feeding back a codebook index corresponding to each of selected codeword vectors, and the quantified result of each relative projection component to the base station.

8. A device for performing codebook processing on channel information, comprising:
- a value space and null space obtaining unit, configured to analyze the channel information obtained by channel estimation, to obtain a value space and a null space;
- a codebook space determining unit, configured to take the value space or the null space which has a small dimension as a codebook space;
- a codebook space vector selecting unit, configured to select one or more codebook space vectors; and
- an information feedback unit, configured to perform separately multidimensional codebook processing on each of the one or more codebook space vectors, and feed back information obtained by the codebook processing to a base station;
- wherein the value space and null space obtaining unit is further configured to:
- perform singular value decomposition (svd) on the channel information obtained by the channel estimation, to obtain three matrixes which respectively are a left singular value matrix, a right singular value matrix, and a singular value matrix; and
- take a vector of the right singular value matrix corresponding to a singular value in the three matrixes of which an absolute value is less than or equal to a preset first threshold as the null space, and take a vector of the right singular value matrix corresponding to a singular value in the three matrixes of which an absolute value is larger than the preset first threshold as the value space;
- wherein the codebook space determining unit is further configured to judge whether vector quantity in the value space is less than or equal to vector quantity in the null space or not; to, if the vector quantity in the value space is less than or equal to the vector quantity in the null space, take the value space as the codebook space; and to, if the vector quantity in the value space is larger than the vector quantity in the null space, take the null space as the codebook space.

9. The device according to claim 8, wherein the codebook space vector selecting unit is further configured to:
- project each of codeword vectors in a codebook table to the codebook space, to obtain a projection vector of each of the codeword vectors; and select successively projection vectors having a same dimension as the codebook space according to a sequence of modulus of the projection vectors from large to small, to obtain the one or more codebook space vectors; or
- take directly a vector of the codebook space as the one codebook space vector.

10. The device according to claim 9, wherein the codebook space vector selecting unit is further configured to select successively the projection vectors having the same dimension as the 15 codebook space, and normalize and orthogonalize each selected projection vector separately to obtain the more codebook space vectors.

11. The device according to claim 9, wherein the information feedback unit is further configured to:
- step a: calculate separately modulus of a product between one of the one or more codebook space vectors and each of codeword vectors in a codebook table to obtain values, and obtain a queue by sorting the obtained values in accordance with a sequence from large to small;
- step b: select a codeword corresponding to a value at a first place of the queue, as a maximum codeword;
- step c: judge whether |one of the one or more codebook space vectors*a maximum codeword vector|$^2$ is larger than or equal to a preset second threshold or not, and when |one of one or more the codebook space vectors*the maximum codeword vector|$^2$ is less than the preset second threshold, select, from an orthogonal basis vector set in which the maximum codeword is located, a codeword corresponding to a value at a second place of the queue as a second maximum codeword; obtain a relative projection component by dividing a component of one of the one or more codebook space vectors on the second maximum codeword by a component of one of the one or more codebook space vectors on the maximum codeword; and perform codebook processing separately on an angle and modulus of the relative projection component to obtain a quantified result;

step d: judge whether $|$one of the one or more codebook space vectors*the maximum codeword vector$|^2$+$|$one of the one or more codebook space vectors*the second maximum codeword vector$|^2$ is larger than or equal to the preset second threshold or not, and when $|$one of the one or more codebook space vectors*the maximum codeword vector$|^2$+$|$one of the one or more codebook space vectors*the second maximum codeword vector$|^2$ is less than the preset second threshold, and select, from the orthogonal basis vector set in which the maximum codeword is located, a codeword corresponding to a value at a third place of the queue as a third maximum codeword;

step e: calculate a relative projection component of one of the one or more codebook space vectors on the third maximum codeword relative to one of the one or more codebook space vectors on the maximum codeword, and perform codebook processing separately on an angle and modulus of the relative projection component to obtain a quantified result, until a quadratic sum of modulus of a product between one of the one or more codebook space vectors and each of selected codeword vectors is larger than or equal to the preset second threshold;

perform codebook processing separately on other of the more codebook space vectors in accordance with the steps a-e; and feed back a codebook index corresponding to each of the selected codeword vectors, and the quantified result of each relative projection component to the base station.

12. The device according to claim 9, wherein the information feedback unit is further configured to:

step A: calculate separately modulus of a product between one of the one or morearw codebook space vectors and each of codeword vectors in a codebook table to obtain values, and obtain a queue by sorting the obtained values in accordance with a sequence from large to small;

step B: select a codeword corresponding to a value at a first place of the queue, as a maximum codeword, and set codeword quantity as an initial value;

step C: judge whether the quantity of the selected maximum codeword reaches a preset second threshold or not, and when the preset second threshold is reached, feed back a codebook index corresponding to a maximum codeword vector to the base station;

step D: when the preset third second threshold is not reached, select, from an orthogonal basis vector set in which the maximum codeword is located, a codeword corresponding to a value at a second place of the queue as a second maximum codeword, and add the codeword quantity by 1; divide a component of one of the one or more codebook space vectors on the second maximum codeword by a component of one of the one or more codebook space vectors on the maximum codeword, to obtain a relative projection component; and perform codebook processing separately on an angle and modulus of the relative projection vector to obtain a quantified result;

step E: judge whether the quantity of the selected second maximum codeword reaches a preset third threshold or not, and when the preset third threshold is not reached, select, from the orthogonal basis vector set in which the maximum codeword is located, a codeword corresponding to a value at a third place of the queue as a third maximum codeword, and add the codeword quantity by 1 again;

step F: calculate a relative projection component of one of the one or more codebook space vectors on the third maximum codeword relative to one of the one or more codebook space vectors on the maximum codeword, and perform codebook processing separately on an angle and modulus of the relative projection component to obtain a quantified result, until quantity of a selected codeword reaches the preset third threshold;

perform codebook processing separately on other of the more codebook space vectors in accordance with the steps A-F; and feed back a codebook index corresponding to each of selected codeword vectors, and the quantified result of each relative projection 15 component to the base station.

13. The device according to claim 8, wherein the information feedback unit is further configured to:

step a: calculate separately modulus of a product between one of the one or more codebook space vectors and each of codeword vectors in a codebook table to obtain values, and obtain a queue by sorting the obtained values in accordance with a sequence from large to small;

step b: select a codeword corresponding to a value at a first place of the queue, as a maximum codeword;

step c: judge whether one of the one or more codebook space vectors*a maximum codeword vector$|^2$ is larger than or equal to a preset second threshold or not, and when $|$one of the one or more codebook space vectors*the maximum codeword vector$|^2$ is less than the preset second threshold, select, from an orthogonal basis vector set in which the maximum codeword is located, a codeword corresponding to a value at a second place of the queue as a second maximum codeword; obtain a relative projection component by dividing a component of one of the one or more codebook space vectors on the second maximum codeword by a component of one of the one or more codebook space vectors on the maximum codeword; and perform codebook processing separately on an angle and modulus of the relative projection component to obtain a quantified result;

step d: judge whether $|$one of the one or more codebook space vectors*the maximum codeword vector $|^2$+$|$one of the one or more codebook space vectors*the second maximum codeword vector$|^2$ is larger than or equal to the preset second threshold or not, and when $|$one of the one or more codebook space vectors*the maximum codeword vector$|^2$+$|$one of the one or more codebook space vectors*the second maximum codeword vector$|^2$ is less than the preset second threshold, and select, from the orthogonal basis vector set in which the maximum codeword is located, a codeword corresponding to a value at a third place of the queue as a third maximum codeword;

step e: calculate a relative projection component of one of the one or more codebook space vectors on the third maximum codeword relative to one of the one or more codebook space vectors on the maximum codeword, and perform codebook processing separately on an angle and modulus of the relative projection component to obtain a quantified result, until a quadratic sum of modulus of a product between one of the one or more codebook space vectors and each of selected codeword vectors is larger than or equal to the preset second threshold;

perform codebook processing separately on other of the more codebook space vectors in accordance with the steps a-e; and feed back a codebook index corresponding to each of the selected codeword vectors, and the quantified result of each relative projection component to the base station.

14. The device according to claim 8, wherein the information feedback unit is further configured to:
step A: calculate separately modulus of a product between one of the one or more codebook space vectors and each of codeword vectors in a codebook table to obtain values, and obtain a queue by sorting the obtained values in accordance with a sequence from large to small;
step B: select a codeword corresponding to a value at a first place of the queue, as a maximum codeword, and set codeword quantity as an initial value;
step C: judge whether the quantity of the selected maximum codeword reaches a preset second threshold or not, and when the preset second threshold is reached, feed back a codebook index corresponding to a maximum codeword vector to the base station;
step D: when the preset second threshold is not reached, select, from an orthogonal basis vector set in which the maximum codeword is located, a codeword corresponding to a value at a second place of the queue as a second maximum codeword, and add the codeword quantity by 1; divide a component of one of the one or more codebook space vectors on the second maximum codeword by a component of one of the one or more codebook space vectors on the maximum codeword, to obtain a relative projection component; and perform codebook processing separately on an angle and modulus of the relative projection vector to obtain a quantified result;
step E: judge whether the quantity of the selected second maximum codeword reaches a preset third threshold or not, and when the preset third threshold is not reached, select, from the orthogonal basis vector set in which the maximum codeword is located, a codeword corresponding to a value at a third place of the queue as a third maximum codeword, and add the codeword quantity by 1 again;
step F: calculate a relative projection component of one of the one or more codebook space vectors on the third maximum codeword relative to one of the one or more codebook space vectors on the maximum codeword, and perform codebook processing separately on an angle and modulus of the relative projection component to obtain a quantified result, until quantity of a selected codeword reaches the preset third threshold;
perform codebook processing separately on other of the more codebook 10 space vectors in accordance with the steps A-F; and
feed back a codebook index corresponding to each of selected codeword vectors, and the quantified result of each relative projection component to the base station.

* * * * *